United States Patent
Ito

(10) Patent No.: US 7,444,994 B2
(45) Date of Patent: Nov. 4, 2008

(54) CONTROL SYSTEM FOR INTERNAL COMBUSTION ENGINE

(75) Inventor: Yasushi Ito, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 84 days.

(21) Appl. No.: 11/628,227

(22) PCT Filed: Jul. 20, 2005

(86) PCT No.: PCT/JP2005/013678

§ 371 (c)(1),
(2), (4) Date: Dec. 1, 2006

(87) PCT Pub. No.: WO2006/011494

PCT Pub. Date: Feb. 2, 2006

(65) Prior Publication Data

US 2008/0060616 A1  Mar. 13, 2008

(30) Foreign Application Priority Data

Jul. 29, 2004  (JP) .............................. 2004-221071

(51) Int. Cl.
F02B 7/00 (2006.01)
F02D 41/10 (2006.01)
(52) U.S. Cl. .................. 123/492; 123/436; 123/431
(58) Field of Classification Search ................ 123/492, 123/1 A, 198 A, 431, DIG. 12, 436
See application file for complete search history.

(56) References Cited

U.S. PATENT DOCUMENTS

| | | | | |
|---|---|---|---|---|
| 5,178,118 A | * | 1/1993 | Nakamats | .................... 123/525 |
| 5,787,864 A | * | 8/1998 | Collier et al. | ................ 123/492 |
| 5,887,554 A | * | 3/1999 | Cohn et al. | .................... 123/3 |
| 6,202,601 B1 | | 3/2001 | Ouellette et al. | |
| 6,655,324 B2 | * | 12/2003 | Cohn et al. | .................. 123/1 A |
| 7,028,644 B2 | * | 4/2006 | Cohn et al. | .................. 123/1 A |
| 7,111,452 B2 | * | 9/2006 | Miyoshi et al. | ................ 60/285 |
| 7,188,607 B2 | * | 3/2007 | Kobayashi | .................. 123/431 |
| 2004/0035395 A1 | | 2/2004 | Heywood et al. | |

FOREIGN PATENT DOCUMENTS

| | | |
|---|---|---|
| DE | 38 28 764 A1 | 3/1990 |
| EP | 1 378 644 A2 | 1/2004 |
| JP | 06-200805 | 7/1994 |
| JP | 07-063128 | 3/1995 |
| JP | 2004-036538 | 2/2004 |
| JP | 2004-116398 | 4/2004 |

OTHER PUBLICATIONS

Japanese Office Action, Appln. No. 2004-221071, dated Aug. 7, 2007.

* cited by examiner

*Primary Examiner*—Hai H Huynh
(74) *Attorney, Agent, or Firm*—Kenyon & Kenyon LLP

(57) ABSTRACT

In order that the acceleration mode hydrogen adding rate "RAcc" used during acceleration increases above the hydrogen adding base rate "RBase" predefined according to a particular operating state, the acceleration mode hydrogen adding rate "RAcc" is set to be the value obtained by adding the hydrogen adding base rate "RBase" and an acceleration incremental value "a". During acceleration, at least hydrogen is supplied on the basis of the acceleration mode hydrogen adding rate "RAcc".

4 Claims, 4 Drawing Sheets

CONTROL SYSTEM FOR INTERNAL COMBUSTION ENGINE

This is a 371 national phase application of PCT/JP2005/013678 filed 20 Jul. 2005, claiming priority to Japanese Patent Application No. 2004-221071 filed 29 Jul. 2004, the contents of which are incorporated herein by reference.

FIELD OF THE INVENTION

The present invention relates to control systems for internal combustion engines, and more particularly, to a control system of an internal combustion engine which uses both a main fuel such as gasoline, and hydrogen, as fuels.

BACKGROUND OF THE INVENTION

Japanese Patent Laid Open No. 2004-116398, for example, discloses information on a conventional internal combustion engine adapted to be operable with gasoline and hydrogen as its fuels. In this internal combustion engine, a hydrogen adding rate is determined for reduced NOx emissions, and the gasoline and the hydrogen are injected at the adding rate.

Including the above-mentioned document, the applicant is aware of the following documents as a related art of the present invention.

[Patent Document 1] Japanese Patent Laid Open No.

SUMMARY OF INVENTION

In the conventional internal combustion engine mentioned above, when the gasoline is injected into an air intake port, part of the injected gasoline adheres to the air intake port and is taken into a cylinder with a delay. The amount of gasoline adhering to the port increases with an increase in the amount of gasoline injected. During acceleration, therefore, an abrupt increase in the amount of gasoline injection augments a delay in supply of the gasoline to the inside of the cylinder due to an increase in the amount of gasoline adhering to the port. Therefore, in the internal combustion engines injecting the main fuel such as gasoline into an air intake port, as in the above conventional internal combustion engine, there is the problem that the response of torque deteriorates during acceleration.

The present invention was made in order to solve such problem as mentioned above, and it is an object of the invention to provide a control system of an internal combustion engine which injects a main fuel into an air intake port, the control system being able to improve response of torque during acceleration.

The above object is achieved by a control system for an internal combustion engine according to a first aspect of the present invention. The control system for an internal combustion engine includes a main fuel injection valve for injecting a main fuel into an air intake port, and a hydrogen injection valve for injecting hydrogen. The control system for an internal combustion engine is adapted to supply the main fuel and the hydrogen as fuels. Acceleration mode fuel supply means is provided for supplying at least the hydrogen during acceleration.

The above object is achieved by a control system for an internal combustion engine according to a second aspect of the present invention. The control system for an internal combustion engine includes a main fuel injection valve for injecting a main fuel into an air intake port, and a hydrogen injection valve for injecting hydrogen. The control system for an internal combustion engine is operated at a hydrogen adding base rate predefined according to a particular operating state. Acceleration mode adding rate setting means by which an addition mode hydrogen adding rate for use in acceleration is set to be higher than the hydrogen adding base rate is provided. Acceleration mode fuel supply means by which, during acceleration, at least the hydrogen is supplied on the basis of the acceleration mode hydrogen adding rate set by the acceleration mode adding rate setting means.

In a third aspect of the present invention, the acceleration mode adding rate setting means according to the second aspect of the present invention may set the acceleration mode hydrogen adding rate so that this rate becomes a maximum during initial acceleration and then gradually decreases.

According to a first aspect of the present invention, it is possible, by supplying the hydrogen that does not adhere to a port during acceleration, at least as part of a fuel, to suppress a delay in a flow of the fuel into a cylinder and thus to improve response of torque during acceleration.

According to a second aspect of the present invention, since an adding rate of the hydrogen that does not adhere to a port during acceleration is increased, it is possible to suppress a delay in a flow of a fuel into a cylinder and thus to improve response of torque during acceleration.

According to a third aspect of the present invention, the acceleration mode hydrogen adding rate used during acceleration can be optimized considering a behavior of a main fuel due to the amount of main fuel adhering to an air intake port wall surface and the like.

DETAILED DESCRIPTION

First Embodiment

Figure 1:
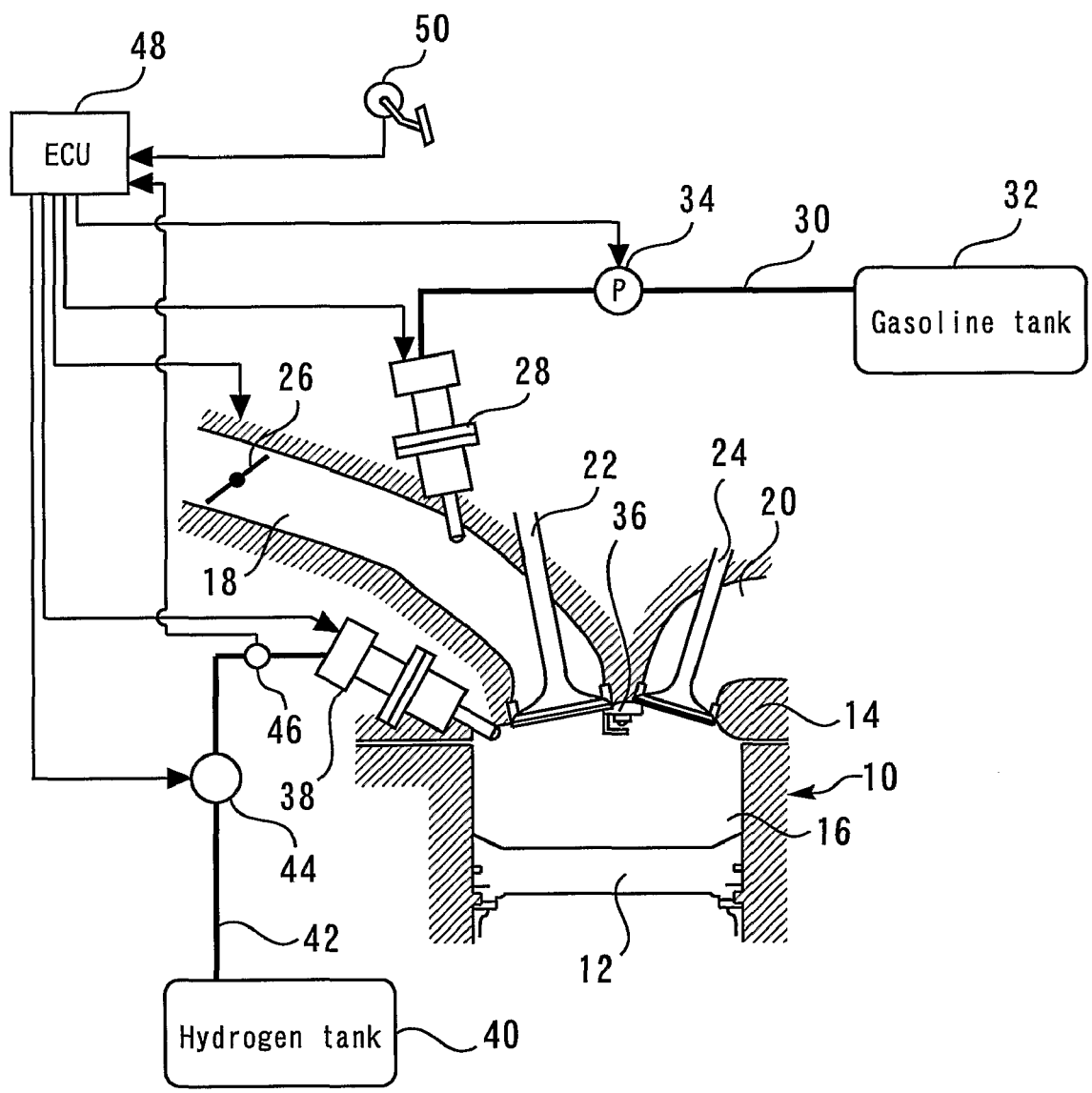
FIG. 1 is a diagram explaining a configuration of an internal combustion engine in a first embodiment of the present invention.

FIG. 1 is a diagram explaining a configuration of an internal combustion engine 10 in a first embodiment of the present invention. The internal combustion engine 10 has a piston 12 that reciprocates inside a cylinder of the engine. The internal combustion engine 10 also has a cylinder head 14. A combustion chamber 16 is formed between the piston 12 and the cylinder head 14. An air intake passageway 18 and an exhaust passageway 20 are communicated with the combustion chamber 16. An air intake valve 22 and an exhaust valve 24 are disposed in the air intake passageway 18 and the exhaust passageway 20, respectively. A throttle valve 26 is also provided in the air intake passageway 18. The throttle valve 26 is an electronically controlled throttle valve whose throttle angle position can be controlled independently of an accelerator angle position.

A gasoline injection valve 28 for injecting the gasoline that is a main fuel, into the air intake port, is provided in the air intake passageway 18. A gasoline tank 32 is communicated with the gasoline injection valve 28 via a gasoline supply pipe 30. The gasoline supply pipe 30 has a pump 34 between the gasoline injection valve 28 and the gasoline tank 32. The pump 34 can supply the gasoline to the gasoline injection valve 28 at a required pressure. This allows the gasoline injection valve 28 to open itself by receiving the driving signal supplied from outside, and thus to inject an appropriate amount of gasoline into the air intake port according to a particular duration of the opened state of the valve.

An ignition plug 36 is installed at the cylinder head 14 in such a way as to protrude from the top of the combustion chamber 16 down into the chamber 16. At the cylinder head 14, a hydrogen injection valve 38 for injecting a hydrogen gas directly into the combustion chamber 16 is also provided therein. A system of the present embodiment has a hydrogen tank 40 for storing at high pressure the hydrogen placed in a gaseous state. The hydrogen tank 40 has a hydrogen supply pipe 42 communicating therewith. The hydrogen supply pipe 42 is communicated with the hydrogen injection valve 38. On the hydrogen supply pipe 42, a regulator 44 is installed between the hydrogen tank 40 and the hydrogen injection valve 38. According to this configuration, hydrogen is supplied to the hydrogen injection valve 38 at the required pressure reduced by the regulator 44. This allows the hydrogen injection valve 38 to open itself by receiving the driving signal supplied from outside, and thus to inject an appropriate amount of hydrogen into the combustion chamber 16 according to a particular duration of the opened state of the valve. A hydrogen pressure sensor 46 that develops an output according to a pressure of the hydrogen gas supplied to the hydrogen injection valve 38 is also built into the hydrogen supply pipe 42, between the regulator 44 and the hydrogen injection valve 38.

The system of the present embodiment also has an ECU 48. In addition to the above mentioned hydrogen pressure sensor 46, an accelerator position sensor 50 and various sensors for detecting an engine speed and other factors (not shown) are connected to the ECU 48 in order to monitor an operating state of the internal combustion engine 10. The above mentioned throttle valve 26, gasoline injection valve 28, pump 34, ignition plug 36, hydrogen injection valve 38, and other pieces of equipment are also connected to the ECU 48. The ECU 48 can appropriately drive the foregoing pieces of equipment by conducting required processing based on outputs of the above sensors.

In the thus configured system of the present embodiment, the amounts of gasoline and hydrogen supplied are controlled to respective optimal values on the basis of the hydrogen adding base rate "$R_{Base}$" predefined according to the particular operating state of the internal combustion engine 10. Better combustion is thus implemented. When a target torque is converted into the amount of heat generated, the hydrogen adding base rate "$R_{Base}$" is predefined as a ratio between the amounts of heat generated by the gasoline and by the hydrogen.

In the internal combustion engines that inject gasoline into an air intake passageway 18, as in the internal combustion engine 10 of the present embodiment, there is the problem that during acceleration, when the amount of gasoline injection is augmented, the amount of gasoline adhering to the port increases to cause a significant delay in supply of the gasoline to the inside of the cylinder and consequently to deteriorate the response of torque. In the system of the present embodiment, therefore, control shown in FIG. 2 is executed to improve the response of torque during acceleration.

Figure 2:
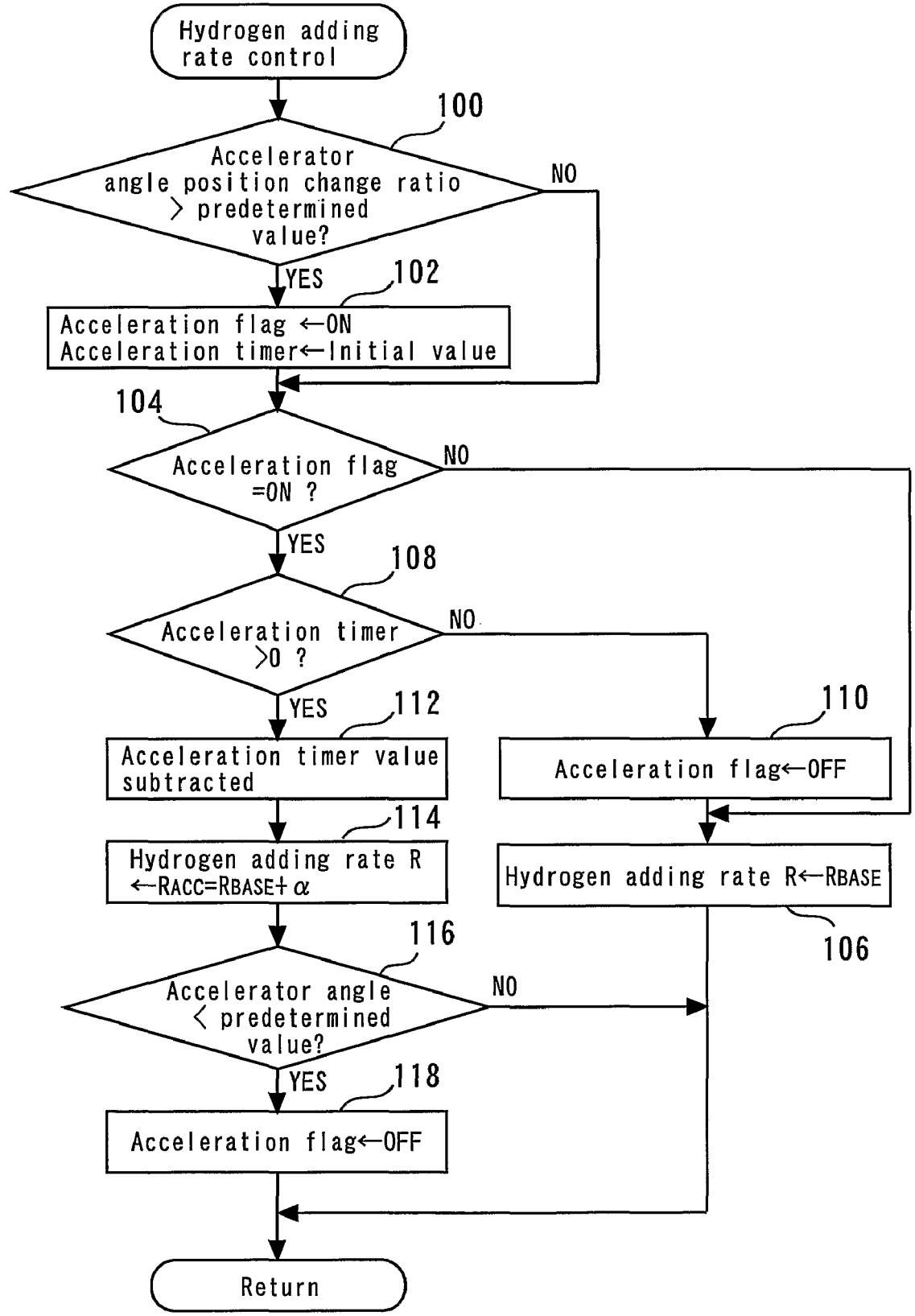
FIG. 2 is a flowchart of the hydrogen adding rate control routine executed in the first embodiment of the present invention.

FIG. 2 is a flowchart of the hydrogen adding rate control routine executed by the ECU 48 of FIG. 1. It is assumed in FIG. 2 that this routine is executed periodically at required time intervals. In the routine of FIG. 2, whether an accelerator angle position change ratio is greater than its predetermined value is judged first (step 100). As a result, if "Accelerator angle position change ratio>Predetermined value" is judged to be established, an acceleration flag is set to ON and at the same time, an acceleration timer is set to its initial value (step 102). Conversely, if the above relationship is judged not to be established, processing in step 104 is executed.

Next, whether the acceleration flag is in an ON state is judged (step 104). As a result, if the acceleration flag is judged not to be in an ON state, the hydrogen adding base rate "$R_{Base}$" is set as a hydrogen adding rate to be used at this time (step 106). The hydrogen adding base rate "$R_{Base}$" is set according to the particular operating state beforehand. That is to say, the hydrogen adding base rate "$R_{Base}$" that has been defined from a relationship with the operating state (i.e., relationship between load factor and engine speed) is stored as a map in the ECU 48. In the system of the present embodiment, in the relatively low load regions used as normal operating regions, gasoline lean burn operation with the hydrogen is executed using a setting of the above map. And the gasoline lean burn operation with the hydrogen is executed using the gasoline and the amount of hydrogen based on the hydrogen adding base rate "$R_{Base}$", as fuels. In other high load regions, gasoline stoichiometric operation is executed using only gasoline as a fuel (i.e., with the hydrogen adding base rate "$R_{Base}$" as zero).

Conversely if, in above step 104, the acceleration flag is judged to be in an ON state, whether a value of the acceleration timer is greater than 0 is identified (step 108). As a result, if "Acceleration timer value>0" is judged not to be established, the acceleration flag is set to an OFF state (step 110). The hydrogen adding base rate "$R_{Base}$" is also set in this case as the hydrogen adding rate to be used at this time (step 106).

If, in above step 108, "Acceleration timer value>0" is judged to be established, a certain value is subtracted from the acceleration timer value (step 112). Next, an acceleration mode hydrogen adding rate "$R_{Acc}$" is set as the hydrogen adding rate to be used at this time (step 114). The acceleration mode hydrogen adding rate "$R_{Acc}$" is set as the value obtained by adding a certain acceleration increment "α" (0<α</=100−$R_{Base}$) to the hydrogen adding base rate "$R_{Base}$" to be used at that time. The acceleration increment "α" used here is set to take a larger value as the accelerator angle increases, and "α" is maintained at a constant value during an operating period of the acceleration timer.

Next, whether the accelerator angle is smaller than a predetermined value is judged (step 116). As a result, if "Accelerator angle<Predetermined value" is judged to be established, that is, if, despite the period during which the acceleration timer is in operation, the accelerator angle is judged to be smaller than the predetermined value, the acceleration flag is set to OFF (step 118). If "Accelerator angle<Predetermined value" is judged not to be established, a current processing cycle is terminated immediately.

Figure 3A:
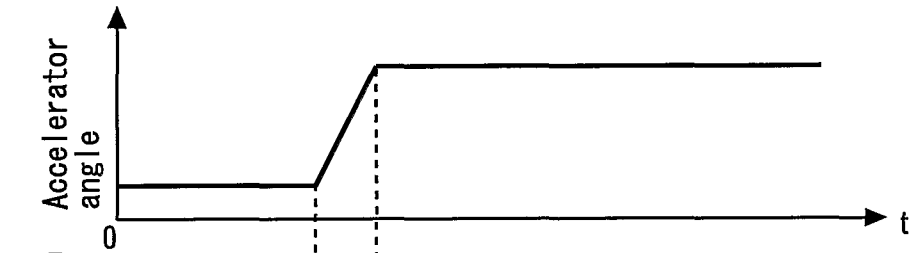
FIGS. 3A to 3E are timing charts showing an example of the operation implemented by the processing routine shown in above FIG. 2.
Figure 3B:
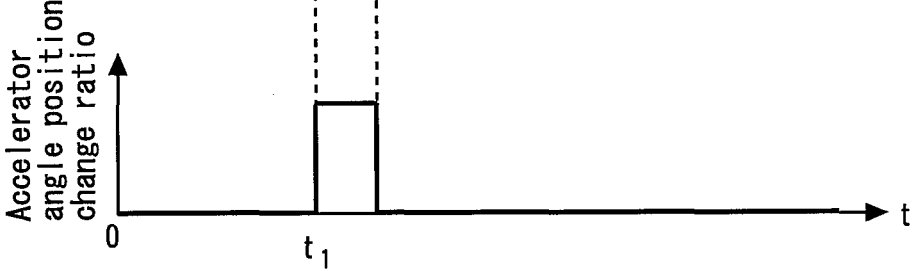
Figure 3C:
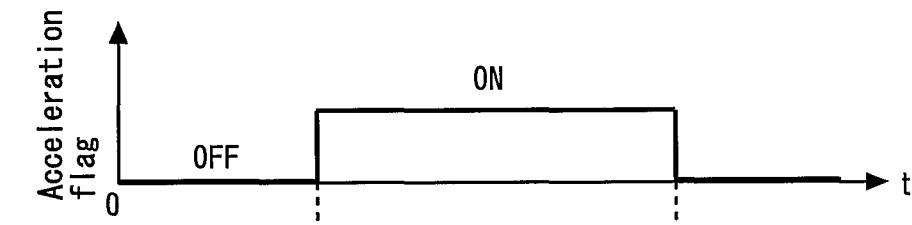
Figure 3D:
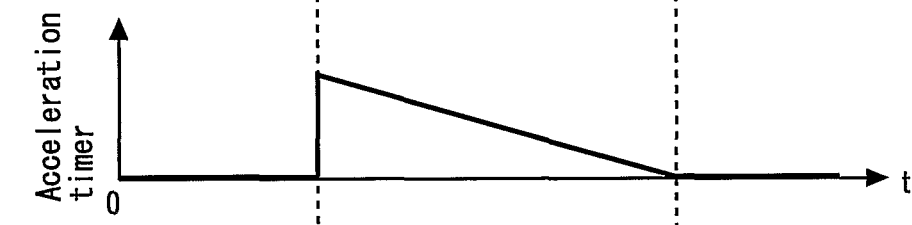
Figure 3E:
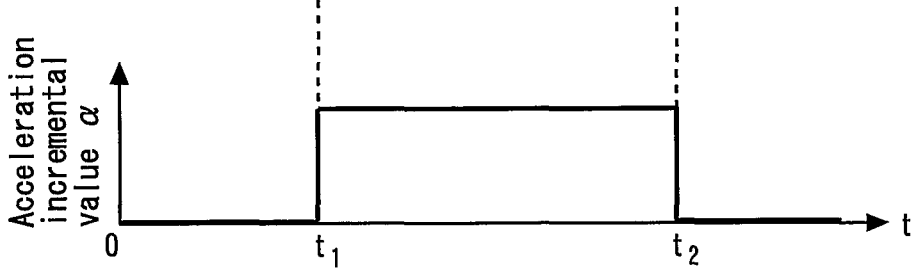

FIGS. 3A to 3E are timing charts showing an example of the operation implemented by the processing routine shown in above FIG. 2. More specifically, FIGS. 3A to 3E show, from a top diagram to a bottom diagram in order, time varying changes in accelerator angle, in accelerator angle position change ratio, in acceleration flag state, in acceleration timer value, and in acceleration incremental value "α". As shown in FIG. 3A, the accelerator angle starts increasing at time "$t_1$" when an accelerator pedal is stepped on. At this time, when the accelerator angle position change ratio exceeds a predetermined value, the acceleration flag is set to ON and measurement of the certain timer operating period ("$t_2-t_1$") is started by the acceleration timer. The acceleration mode hydrogen adding rate "$R_{Acc}$" used during the operating period of the acceleration timer is, as mentioned above, set to the value obtained by adding the acceleration increment "α" of FIG. 3E to the hydrogen adding base rate "$R_{Base}$"

According to such setting as mentioned above, the acceleration mode hydrogen adding rates "$R_{Acc}$" at each point of time after acceleration has been started always increase by acceleration incremental value "α", with respect to the hydrogen adding base rate "$R_{Base}$" at the above point of time that becomes constant or changes, depending on the operating state. More specifically, in the internal combustion engine 10 operated at the hydrogen adding base rate "$R_{Base}$" predefined according to the particular operating state, values of the hydrogen adding base rate "$R_{Base}$" existing before and after the acceleration are likely to take the following relationships when the operating state is changed by the acceleration. That is, during the acceleration in a region of a gasoline lean burn operation with the hydrogen, the hydrogen adding base rates "$R_{Base}$" may not change before or after the acceleration, or the hydrogen adding base rates "$R_{Base}$" after the acceleration has been started may become smaller than before the start of the acceleration. Additionally, operation in the region of the gasoline lean burn operation with the hydrogen may shift to acceleration in a gasoline stoichiometric operating region (for example, a change of the hydrogen adding base rate "$R_{Base}$" from 20 percent to 0 percent brings about such acceleration). Additionally acceleration may occur within a gasoline stoichiometric operating region without the hydrogen. According to such setting as mentioned above, even when the hydrogen adding base rate "$R_{Base}$" assumes any of the above relationships, hydrogen is always injected, during acceleration, in the quantity increased by an equivalent of acceleration incremental value "α", with respect to the hydrogen adding base rates "$R_{Base}$" (inclusive of zero) at each point of time.

According to the above described processing routine of FIG. 2, since the adding rate of the hydrogen which does not adhere to the port during acceleration is increased, a delay in the flow of the gasoline into the cylinder can be compensated for by supplying the hydrogen. The response of torque during acceleration can thus be improved.

In the first embodiment described above, for the internal combustion engine 10 in which the amount of hydrogen adding to the gasoline is controlled at the hydrogen adding base rate "$R_{Base}$" (inclusive of zero) predefined according to the particular operating state, at least hydrogen is supplied on the basis of the acceleration mode hydrogen adding rate "$R_{Acc}$" that has been set to a value larger than the hydrogen adding base rate "$R_{Base}$". The acceleration mode fuel supply means employed in the present invention, however, is not limited to the above method. That is to say, during acceleration, the required amount of hydrogen may be injected with or in stead of gasoline into an internal combustion engine not having a setting of a hydrogen adding rate according to the particular operating state.

Also, while, in the first embodiment described above, hydrogen is injected directly into the combustion chamber 16 via the hydrogen injection valve 38, the hydrogen supply means employed in the present invention is not limited to the above method. For example, hydrogen may be injected into the air intake port by building the hydrogen injection valve 38 into the air intake passageway 18, since the hydrogen is a gaseous fuel that does not adhere to the port.

In the first embodiment described above, the ECU 48 executes processing of above step 114, and this achieves the "acceleration mode adding rate setting means" in the earlier mentioned second aspect of the present invention.

Second Embodiment

Next, a second embodiment of the present invention will be described referring to FIGS. 4A to 4F.

A system of the present embodiment is realized by making an ECU 48 execute a routine similar to that of FIG. 2, by use of the system configuration of the above described first embodiment. More specifically, processing in the routine similar to that of FIG. 2 is essentially the same as the processing routine shown in FIG. 2, except that a setting of an acceleration incremental value "β" of a hydrogen adding ratio differs from the setting of the acceleration incremental value "α" in the above described first embodiment. For this reason, description based on a flowchart will be omitted hereinafter and a description will be given of setting an acceleration mode hydrogen adding rate "$R_{Acc}$" in the present second embodiment referring to FIGS. 4A to 4F.

Figure 4A:
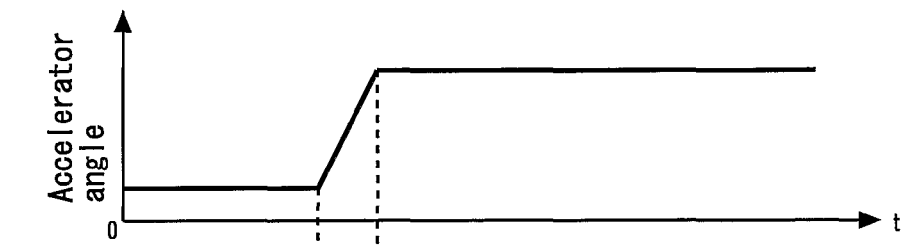
FIGS. 4A to 4F are timing charts showing an example of the operation implemented by the system of the second embodiment of the present invention.
Figure 4B:
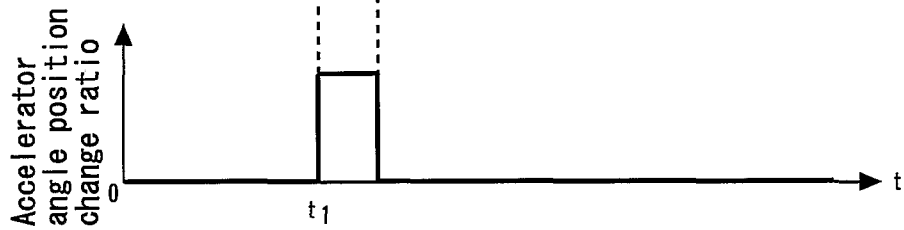
Figure 4C:
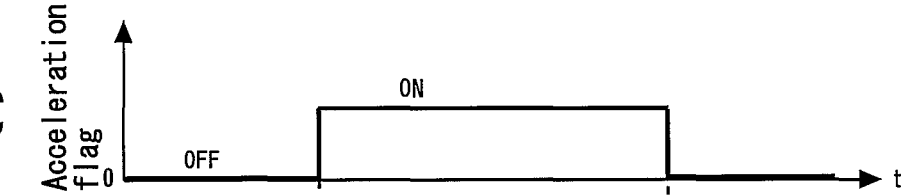
Figure 4D:
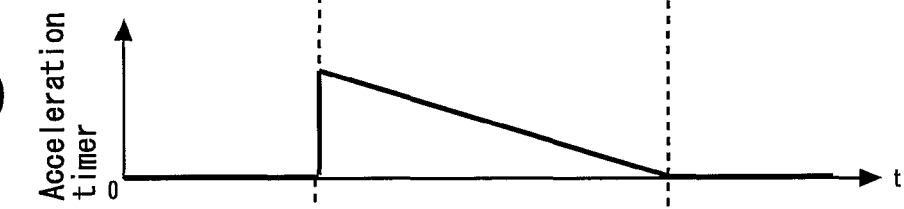
Figure 4E:
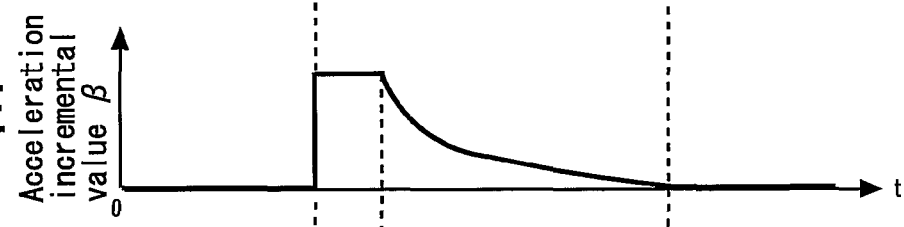
Figure 4F:
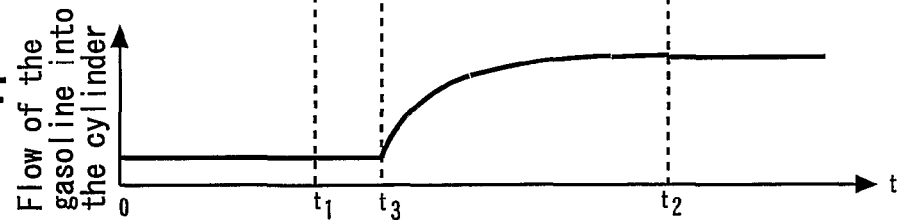

FIGS. 4A to 4F are timing charts showing an example of the operation implemented by the system of the present embodiment. FIGS. 4A to 4E show time varying changes in accelerator angle, in accelerator angle position change ratio, in acceleration flag state, in acceleration timer value, and in acceleration incremental value "β", respectively. In addition, FIG. 4F shows time varying changes in a flow of the gasoline into the cylinder during acceleration. At time "t1", when acceleration is started, the amount of gasoline injected into the air intake port is increased and part of the injected gasoline adheres to a wall surface and others of the intake port. Therefore the flow of the gasoline into the cylinder is not increased immediately after the start of acceleration. That is, the gasoline flows into the cylinder with the timing delay shown as $(t_3-t_1)$ in FIG. 4F. And after this delay, the flow of the gasoline into the cylinder begins to increase when the amount of fuel adhering to the intake port leaves the wall surface and others of the port.

In the system of the present embodiment, therefore, the acceleration incremental value "β" at the acceleration mode hydrogen adding rate "$R_{Acc}$" is set to become a maximum during initial acceleration, namely, a delay period $(t_3-t_1)$, then gradually decrease as the gasoline flow becomes able to follow up the acceleration, and finally, become equal to the hydrogen adding base rate "$R_{Base}$" when the operation of the acceleration timer is completed. The ECU 48 has the acceleration incremental value "β" stored as a map that has been defined from a relationship with the acceleration timer value. The ECU 48 calculates the acceleration mode hydrogen adding rate "$R_{Acc}$" by adding the hydrogen adding base rate "$R_{Base}$" at each stage during acceleration to the acceleration incremental value "β" referring to the map.

Furthermore, the ECU 48 has a map of the delay period $(t_3-t_1)$ that has been defined from a relationship with the acceleration angle position change amount and its ratio. The acceleration incremental value "β" during initial acceleration is set to become a maximum during the delay period $(t_3-t_1)$ referring to the map. The acceleration incremental value "β" is also set to increase in overall level with an increase in the accelerator angle. The acceleration timer has its operating period $(t_2-t_1)$ set to ensure a period during which the gasoline flow becomes able to sufficiently follow up the acceleration.

According to these settings, the acceleration mode hydrogen adding rate "$R_{Acc}$" used during acceleration can be optimized considering a behavior of the gasoline adhering to the air intake port wall surface and the like.

The invention claimed is:

1. A control system for an internal combustion engine equipped with a main fuel injection valve for injecting a main fuel into an air intake port, and with a hydrogen injection valve for injecting hydrogen, and operated at a hydrogen adding base rate predefined in a map according to a particular operating state based upon a relationship between engine load and speed, said system comprising:

an acceleration timer for determining an acceleration timer value;

acceleration mode adding rate setting means by which an acceleration mode hydrogen adding rate for use in acceleration is set to be higher than the hydrogen adding base rate; and acceleration mode fuel supply means by which, during acceleration, at least the hydrogen is supplied on the basis of the acceleration mode hydrogen adding rate set by said acceleration mode adding rate setting means and the acceleration timer value.

2. The control system for an internal combustion engine according to claim 1, wherein said acceleration mode adding rate setting means sets the acceleration mode hydrogen adding rate so that this rate becomes a maximum during initial acceleration and then gradually decreases.

3. A control system for an internal combustion engine equipped with a main fuel injection valve for injecting a main fuel into an air intake port, and with a hydrogen injection valve for injecting hydrogen, and operated at a hydrogen adding base rate predefined in a map according to a particular operating state based upon a relationship between engine load and speed, said system comprising:

an acceleration timer for determining an acceleration timer value;

acceleration mode adding rate setting unit by which an acceleration mode hydrogen adding rate for use in acceleration is set to be higher than the hydrogen adding base rate; and acceleration mode fuel supply unit by which, during acceleration, at least the hydrogen is supplied on the basis of the acceleration mode hydrogen adding rate set by said acceleration mode adding rate setting unit and the acceleration timer value.

4. The control system for an internal combustion engine according to claim 3, wherein said acceleration mode adding rate setting unit sets the acceleration mode hydrogen adding rate so that this rate becomes a maximum during initial acceleration and then gradually decreases.

\* \* \* \* \*